United States Patent [19]
Williams

[11] 3,924,891
[45] Dec. 9, 1975

[54] FOLDING BENCH-TYPE SEAT FOR A MOTOR GRADER

[75] Inventor: Lary Lynn Williams, Dubuque, Iowa

[73] Assignee: Deere & Company, Moline, Ill.

[22] Filed: Feb. 20, 1974

[21] Appl. No.: 443,967

[52] U.S. Cl. .................................. 297/334; 248/429
[51] Int. Cl.² ............................................ A47C 4/00
[58] Field of Search .......... 297/334, 337, 331, 338, 297/335, 283, 1; 248/429, 430

[56] References Cited
UNITED STATES PATENTS

| | | | |
|---|---|---|---|
| 90,613 | 5/1869 | Vogel | 297/1 X |
| 325,283 | 9/1885 | Stone | 297/334 X |
| 427,570 | 5/1890 | Harwood | 297/334 X |
| 3,222,106 | 12/1965 | Stout | 297/338 X |
| 3,347,512 | 10/1967 | Campbell | 248/429 |
| 3,350,046 | 10/1967 | Kirk | 248/430 |
| 3,442,552 | 5/1969 | Lehner | 297/334 |

*Primary Examiner*—Francis K. Zugel

[57] ABSTRACT

A motor grader includes a bench-type seat structure including a seat cushion which is adjustable fore and aft which is foldable from a normal position wherein a first surface thereof is disposed to receive an operator in a normal seated position and a folded position wherein a second surface thereof is disposed to receive an operator in a semi-standing position, the first surface then facing forwardly. An over-center linkage is connected between a frame portion of the seat structure and the seat cushion and acts to guide the seat cushion between its normal and folded positions, the linkage moving to an over-center position when the seat is folded.

3 Claims, 5 Drawing Figures

FOLDING BENCH-TYPE SEAT FOR A MOTOR GRADER

BACKGROUND OF THE INVENTION

The present invention relates to a vehicle seat structure and more particularly relates to a structure wherein a seat cushion is mounted for fore-and-aft adjustment and for movement between a normal position for receiving an operator in a normal seated position and a folded position for permitting an operator to stand on the floor of the operator's station forwardly of the seat or for supporting the operator in a semi-standing position.

The use of folding seat cushions to permit an operator to sit or stand are known. However, many of these known structures are not desirable since when the seat is moved to its folded position the bottom of the seat cushion and linkages having rough surfaces are exposed such that the back of the legs of the operator may come in contact therewith thus causing him discomfort. Also, the known seat structures often include relatively complicated apparatus and linkages for permitting the seat cushion to be adjusted fore and aft as well as permitting it to be folded.

SUMMARY OF THE INVENTION

According to the present invention there is provided a novel seat structure for a vehicle such as an agricultural or industrial tractor and more particularly there is provided a novel seat structure whereby the seat cushion may be adjusted fore and aft and may be folded from a normal position for receiving an operator in a normal seated position and a folded position for permitting the operator to either stand erect on the operator's station floor forwardly of the seat or to lean against the front and upper sides of the folded seat.

It is an object of the invention to provide a foldable seat cushion which when folded will be disposed so as to prevent the back portions of an operator's legs from coming into engagement with any rough surfaces of the seat structure.

Another object is to provide such a foldable seat cushion which when in its folded position has an upper surface disposed at a level conducive to supporting an operator in a semi-standing position.

A more specific object is to provide such a foldable seat which is supported on the frame of the seat structure through means of an over-center linkage which is just over center when the seat is in its folded position whereby the over-center action of the linkage must be overcome before the seat can return to its normal position.

Yet another object is to provide a seat structure as described in the object above wherein the seat cushion is adjustable fore and aft and has a latch operating lever connected thereto and operative for disengaging a latch mechanism when the seat cushion is in its normal position and it is desired to adjust the cushion fore and aft.

These and other objects will become apparent from a reading of the following description in conjunction with the appended drawings.

DESCRIPTION OF THE PREFERRED EMBODIMENT

Figure 1:
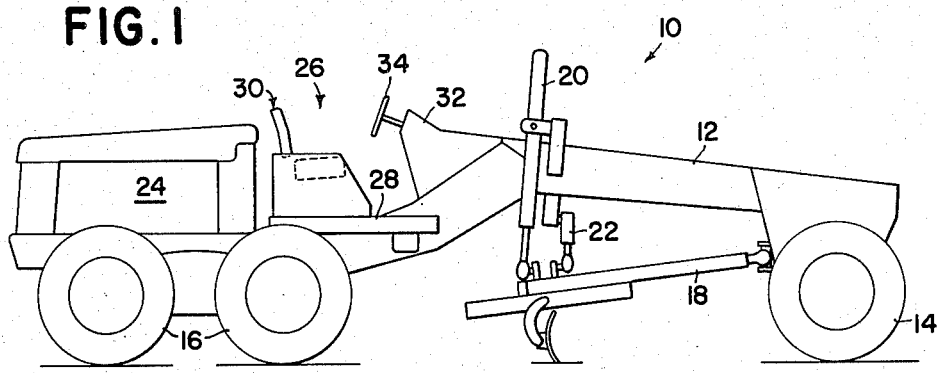
FIG. 1 is a schematic representation of a typical vehicle with which the present invention is particularly adaptable for use.

Referring now to FIG. 1, therein is shown a motor grader which is a typical vehicle with which the seat structure of the present invention is particularly adapted for use, the vehicle being indicated in its entirety by the reference numeral 10. The motor grader 10 is of conventional construction and includes a main frame 12 having an elevated forward portion which is supported upon a pair of front wheels 14 and a rearward horizontal portion which is supported upon two pairs of rear wheels 16. Positioned beneath the raised forward portion of the main frame 12 is a blade-carrying drawbar 18 having its forward end pivotally connected to the main frame in the vicinity of the front wheels 14 and having its rearward end supported by three hydraulic actuators, two of which are shown at 20 and 22. An internal combustion engine 24 is mounted on the rear portion of the main frame 12. Just forwardly of the engine is an operator's station 26 including a platform or floor 28 which supports a seat structure 30. Spaced forwardly of the seat structure so as to be within easy view and reach of an operator seated on the seat structure is a control console 32 from which projects a steering wheel 34.

Figure 2:
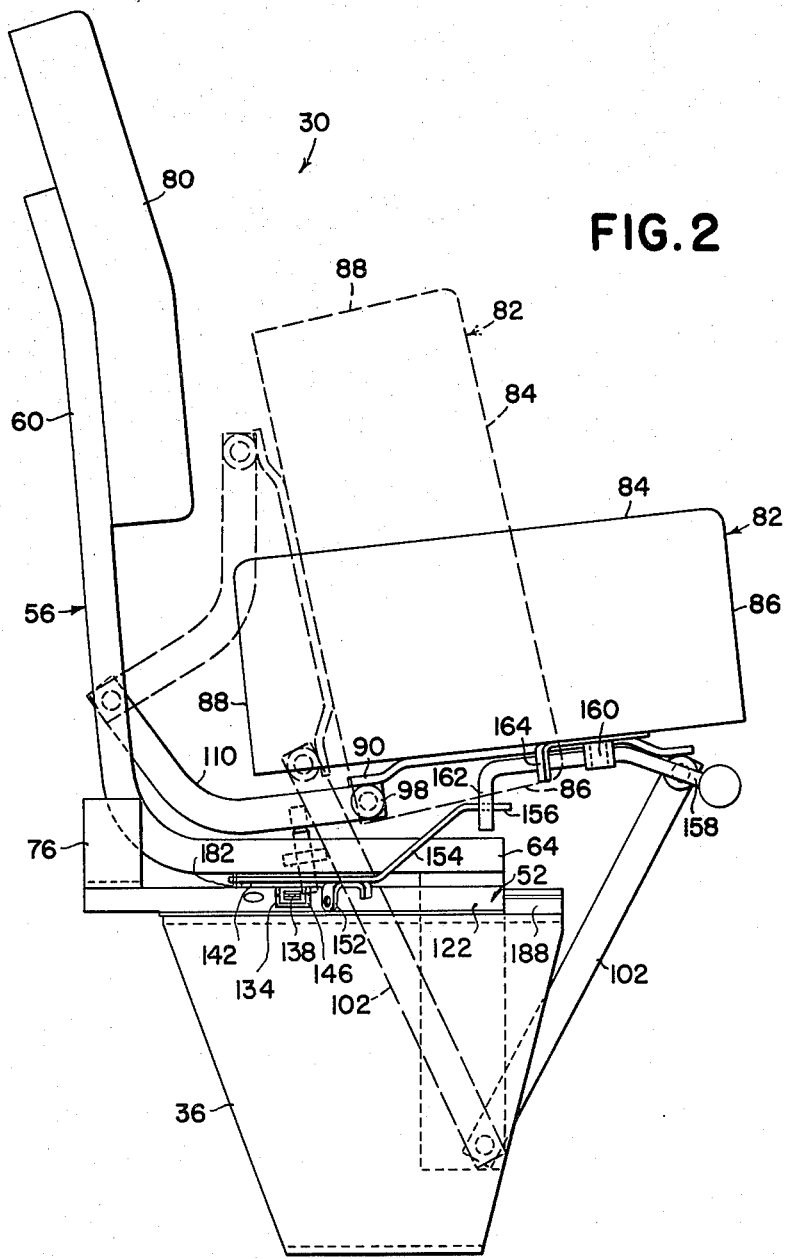
FIG. 2 is a side elevational view showing the seat structure of the present invention. but with part of the latch mechanism thereof omitted for clarity.
Figure 3:
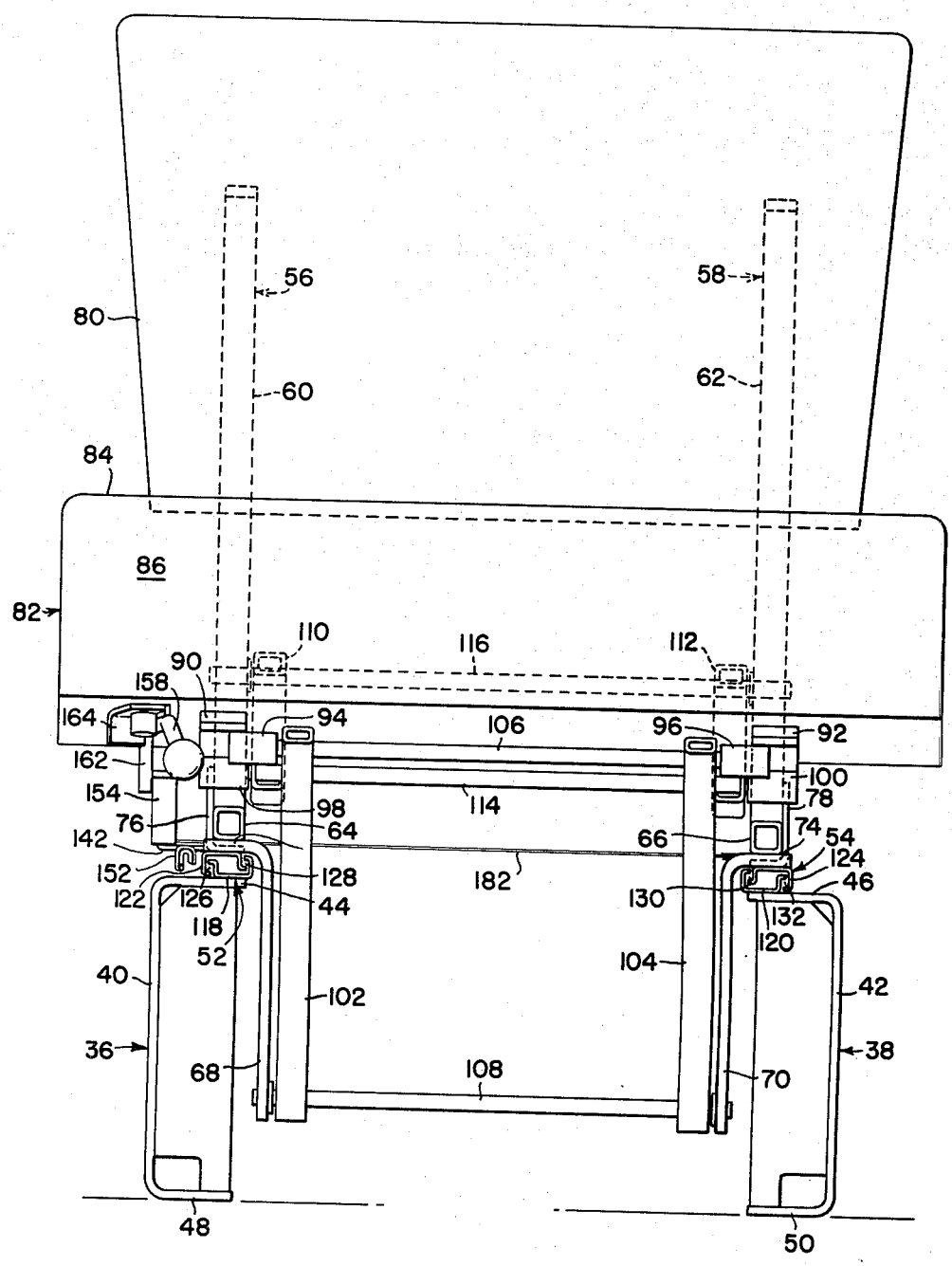
FIG. 3 is a front elevational view of the seat structure shown in FIG. 2.
Figure 4:
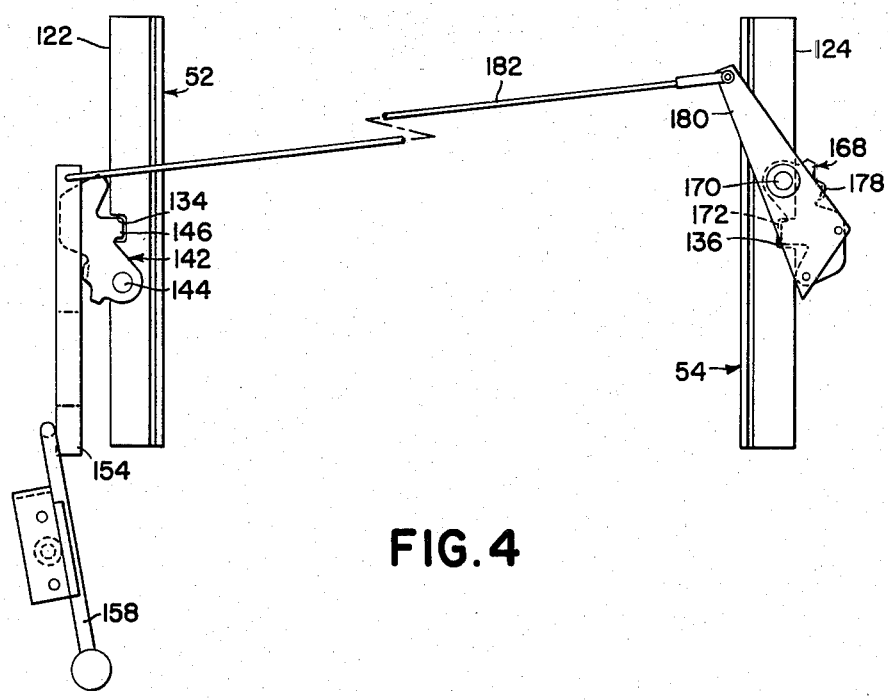
FIG. 4 is a top plan view showing a portion of the latch mechanism for maintaining a seat cushion in a desired position of fore and aft adjustment.
Figure 5:
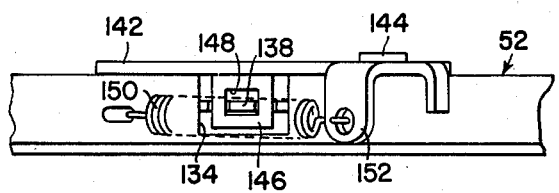
FIG. 5 is an enlarged left side view of part of the mechanism shown in FIG. 4.

Referring now to FIGS. 2–5, therein is shown the seat structure 30. The seat structure 30 includes a support frame means including a fixed or base portion comprising transversely spaced right and left-hand base members 36 and 38, respectively. The base members 36 and 38 are channel-like and include respective vertical walls 40 and 42 and respective inwardly extending upper flanges 44 and 46 and lower flanges 48 and 50. The support frame means further includes a shiftable frame portion which is secured to the top surfaces of the upper flanges 44 and 46 through means of right and left guide track means 52 and 54, respectively, which are to be further described below. The movable frame portion comprises transversely spaced right and left members 56 and 58 which appear L-shaped in side view as seen in FIG. 2. The members 56 and 58 respectively include upwardly projecting back portions 60 and 62 and respective fore-and-aft extending bottom portions 64 and 66, the bottom portions 64 and 66 being respectively disposed directly above the right and left guide track means 52 and 54. Respectively projecting downwardly at locations just inwardly of the right and left base members 36 and 38 are right and left legs 68 and 70 which have respective outwardly turned tops 72 and 74 which are secured to and sandwiched between the forward ends of the bottom portions 64 and 66 of the L-shaped members 56 and 58 and the right and left guide track means 52 and 54. The right and left L-shaped members 56 and 58 are further respectively secured to the tops of the right and left guide track means 52 and 54 through means of right and left L-shaped brackets 76 and 78 having respective horizontal legs fixed to the tops of the right and left guide track means 52 and 54 and having respective vertical legs fixed to the L-shaped members 56 and 58 respectively at the bottoms of the back portions 60 and 62. Secured across the upper portions of the back portions 60 and 62 of the right and left L-shaped members 56 and 58 is a cushion structure which forms a backrest 80. Extending transversely and overlying the bottom portions 64 and 66 of the L-shaped members 56 and 58 is a seat cushion 82. As viewed in FIG. 2, the seat cushion is shown in solid lines in a normal position for receiving an operator in a normal seated position and is shown in dashed lines in a folded position for permitting an operator to stand forwardly thereof or to assume a semistanding position wherein he leans against the seat cushion while at the same time having his feet in engagement with the floor 28. As considered in its normal position, the seat cushion 82 includes a substantially horizontal upper surface 84 and respective front and rear surfaces 86 and 88 which are contiguous with and make respective 90°angles with the upper surface. The cushion is constructed in a conventional manner which results in the upper front and rear surfaces 84, 86 and 88 being pliable so that the operator will be comfortable when engaging the surfaces. Forming a part of the underside of the seat cushion 82 are transversely spaced fore-and-aft extending right and left strap-like members 90 and 92. The members 90 and 92 have respective downwardly angled front and rear ends and fixed to the front ends of the members are respective right and left front receptacle members 94 and 96 having openings aligned relative to a first horizontal transverse axis. Connected to the rear ends of the strap-like members 90 and 92 are right and left rear receptacles 98 and 100 respectively having openings aligned relative to a second transverse horizontal axis.

For the purpose of connecting the seat cushion 82 to the movable section of the support frame means, there is provided an over-center linkage means including front, right and left links 102 and 104 respectively having their upper ends located just inwardly of the right and left front receptacles 94 and 96 and pivotally supported on a horizontal transverse rod 106 having its opposite ends received in the receptacles 94 and 96. The lower ends of the links 102 and 104 are respectively located just inwardly of the lower portions of the right and left legs 68 and 70 and are supported through means of a rod 108 having its opposite ends pivotally received in the legs 68 and 70. The over-center linkage means further includes angled right and left rear links 110 and 112 having their respective forward ends located just inwardly of the right and left rear receptacles 98 and 100 and supported on a transverse horizontal rod 114 having its opposite ends received in the receptacles 98 and 100. The respective rear ends of the links 110 and 112 are disposed just inwardly of the back portions 60 and 62 of the L-shaped members 56 and 58 at an elevation approximately midway between the bottom of the backrest 80 and the bottom portions 64 and 66. As viewed in FIG. 2, the overcenter linkage means is shown in solid lines in a collapsed condition, which corresponds with the solid line normal position of the seat cushion 82, and is shown in dashed lines in an over-center condition which corresponds to the dashed line folded position of the seat cushion 82. When the over-center linkage means is in its over-center condition, the pivot axis defined by the rod 106 at the forward ends of the right links 102 and 104 is slightly to the left of the line of centers joining the respective pivot axes defined by the rods 108 and 114. Thus, it will be appreciated that when the seat is in its folded condition, the seat will not return to its normal position in response to a downward force being applied to the rear surface 88.

The right and left guide track means 52 and 54 form part of the means by which the seat cushion 82 may be adjusted fore and aft. Specifically, the right and left guide track means 52 and 54 respectively include right and left upwardly opening, channel-like members 118 and 120 having respective web portions fixed to the tops of the upper flanges 44 and 46, and respective right and left downwardly opening channel-like members 122 and 124 having respective web portions fixed to the undersides of the outwardly turned tops 72 and 74 of the right and left legs 68 and 70. The right top and bottom channel-like members 118 and 122 are interengaged and the legs thereof form fore-and-aft extending bearing races 126 and 128 in which are located a plurality of ball bearings, or the like, not shown. Similarly, the left top and bottom channel-like members 124 and 120 are interengaged and the legs thereof form a pair of fore-and-aft extending bearing races 130 and 132 in which are located a plurality of ball bearings, or the like, not shown. The right and left guide track means 52 and 54 are of a conventional construction by which the top channel-like members 122 and 124 may shift fore and aft relative to the bottom channel-like members 118 and 120, respectively.

A latch means is provided for the purpose of selectively fixing the top channel members 122 and 124 in selected fore-and-aft positions relative to the bottom channel-like members 118 and 120. Specifically, the right and left top channel-like members 122 and 124 are respectively provided with latch receiving notches 134 and 136 located in the outer sides of and midway between the front and rear ends of the members 122 and 124. Disposed for registering with the notch 134 in the right top channel 122 are a plurality of teeth 138 formed in the outer edge of the right bottom channel-like member 118. Similarly, a plurality of teeth (not shown) are formed in the outer edge of the left bottom channel-like member 120 for register with the notch 136 in the top right channel-like member 124. A plate-like latch member 142 is pivotally mounted on the top of the channel-like member 122 through means of an upright pin 144 located just forwardly of the notch 134. The latch member 142 includes a downwardly bent locking tab 146 located and dimensioned such that it will move into the notch 134, the tab being provided with a transverse rectangular aperture 148 dimensioned for receiving a selected one of the teeth 138. As illustrated, the latch member 142 is in its latched position and a coil tension return spring 150 is connected between the channel-like member 122 and a downturned tab 152 of the latch member to keep the latter biased in a direction to maintain it in the latched position. Fixed to the outer portion of the latch member 142 and generally paralleling the right guide track means 52 is a lever 154. The lever 154 has a forward end portion which is inclined upwardly and forwardly from the latch member 142 and terminates in a generally horizontal end portion 156. For the purpose of contacting the outer side of the end portion 156 of the lever 154 for exerting a pressure for causing the lever to effect rotation of the latch member 142 about its connection pin 144 to disengage the locking tab 146, a hand lever 158 is mounted on the bottom of the seat cushion 82 for sideway swinging movement about a generally vertical axis defined by a mounting pin located at 160. The hand lever 158 includes a downturned rear end portion 162 which is disposed so as to engage the end portion 156 of the lever 154 when the lever 158 is pivoted. The mounting structure for the lever 158 includes a downturned tab which serves as a stop 164 for preventing movement of the lever beyond a certain point. A left latch member 168 similar in construction to the latch member 142 is pivotally mounted on the top of the left top channel-like member 124 through means of a generally vertical pin 170 positioned just forwardly of the notch 136. The latch member 168 includes a downturned locking tab 172 positioned and dimensioned for movement into and out of the notch 136, the locking tab being provided with a rectangular aperture (not shown) for receiving a respective one of the teeth formed in the bottom channel member 120 when the latch member is in a latched position as shown. For the purpose of retaining the latch member 168 in its latched position, a tension coil return spring (not shown) is connected between the channel-like member 124 and a downturned tab 178 of the latch member 168. Secured to the top of the left latch member 168 and extending rearwardly thereabove, is a lever 180. For the purpose of causing simultaneous unlatching of the latch members 142 and 168 a tie rod 182 is interconnected between levers 154 and 180. Thus, it will be appreciated that in order for an operator to effect fore-and-aft adjustment of the seat cushion 82, he need only to swing the hand lever 158 outwardly so as to cause inward pivotal movement of the lever 154 which is transferred directly to the latch member 142 and indirectly to the latch member 168 by means of the tie rod 182 to cause simultaneous disengagement of the locking tabs 146 and 172.

The operation of the seat structure 30 is as follows. Assuming that an operator wishes to operate the motor grader 10 in a normal seated position, the seat cushion 82 will be positioned in its normal position as shown in FIG. 2. If the operator desires to adjust the seat cushion either forwardly or rearwardly, he may do so by pivoting the hand lever 158 outwardly to cause simultaneous disengagement of the locking tabs of the right and left latch members 142 and 168. Simultaneous with keeping the layer 154 in its outwardly pivoted position, the operator need only to exert a rearward pushing or a forward pulling force on the seat cushions 82 in order to cause it to respectively move rearwardly or forwardly to a new position. When the seat cushion 82 is in a desired position the operator may then release the lever 154 and the return springs acting on the latch members 142 and 168 will respectively act to return the locking tabs 146 and 172 to positions in the notches 134 and 136 whereat they will receive respective ones of the teeth formed in the lower channel-like members 118 and 120 when the teeth become aligned with the respective apertures in the tabs.

If the operator should desire to change from a seated position to a standing position for operating the motor grader 10, he need only to remove his weight from the seat cushion 82 and grasp the bottom rear portion of the seat cushion and pull upwardly. The linkage defined by the front pair links 102 and 104 and the rear pair of links 110 and 112 will cause the seat to be guided such that the front surface 86 is guided downwardly and rearwardly while at the same time the rear surface 88 is guided upwardly and forwardly, the movement continuing until the seat cushion 82 has been swung to the extent that it is approximately displaced 90° from its normal position. The rear surface 88 of the seat cushion will then be substantially horizontal while the upper surface 84 will then be approximately vertically disposed. When the seat 82 is in its folded position as shown in dashed lines in FIG. 2, the linkage will be in an over-center condition wherein the pivot axis defined by the rod 106 will be slightly rearwardly of the line of centers extending between the respective pivot axes defined by the rods 108 and 114. Because of this over-center condition of the linkage, the operator may rest on the rear surface 88 while standing without fear that the linkage will collapse. It is significant to note that because the seat is folded such that its upper surface 84 faces forwardly when the seat is folded, the surface 84 provides a surface against which the backs of the legs of the operator may come into contact without causing the operator any discomfort. Also, it is to be noted that the surface 84 extends forwardly of any of the support linkage or latch operating mechanism of the seat and thus protects the backside of the operator's legs by preventing them from coming into contact with the seat frame structure, linkages or latch mechanisms when the seat cushion is in its folded position.

I claim:

1. A vehicle seat structure comprising: a support frame, a seat cushion including first and second transverse contiguous surfaces extending substantially perpendicular to each other; linkage means including over-center link means connecting said seat cushion to said support frame for movement between a normal position, wherein said first seat cushion surface is generally horizontal and upwardly facing, said second seat cushion surface is generally vertical and rearwardly facing and said link means is in a collapsed condition, and a folded position wherein said first seat cushion surface is generally vertical and forwardly facing, said second seat cushion surface is generally horizontal and upwardly facing and said link means is in a slightly over-center condition tending to resist movement thereof back to said collapsed condition; said first surface including a portion which is forward of said link means when said seat cushion is in said folded position and when respectively considered with the cushion in its normal and folded positions, said first surface having a fore-and-aft dimension which is at least twice that of the second surface; said support frame including a movable portion and a fixed portion; the over-center link means being connected only to the movable frame portion having respective cooperating surface means for retaining and guiding said movable frame portion for fore-and-aft shifting movement; latch receptacle means formed in said cooperating surface means; a latch means movably mounted on said fixed frame portion and including a portion disposed for engagement with said latch receptacle means when the latch means is in a latching position to prevent movement of the movable frame portion; biasing means urging said latch means towards its latching position; said latch means being movable to an unlatched position wherein said portion thereof is free from said latch receptacle; and lever means pivotally mounted on said seat cushion and selectively swingable to engage and operate said latch means when said seat cushion is in said normal position.

2. A vehicle seat structure comprising: a support frame; a backrest fixed to the support frame; a seat cushion having a normal substantially horizontal operative position located just forwardly and below the level of said backrest; said seat cushion having a normal seating surface which is substantially horizontal and faces upwardly when the seat cushion is in said normal position, the seating surface being wider than the contiguous to an auxiliary operator supporting surface, which is substantially perpendicular to said seating surface rearwardly when the seat cushion is in said normal position; linkage means including over-center means connecting said cushion to said support frame for guiding the seat cushion between the normal position and a folded position displaced approximately 90° from the normal position wherein the seat cushion generally parallels the backrest and overlaps a bottom portion thereof and said seating surface faces forwardly while the auxiliary surface faces upwardly; said support frame including a movable portion and a fixed portion; the over-center link means being connected only to the movable frame portion; said fixed and movable frame portions having respective cooperating surface means for retaining and guiding said movable frame portion for fore-and-aft shifting movement; latch receptacle means formed in said cooperating surface means; a latch means movably mounted on said fixed frame portion and including a portion disposed for engagement with said latch receptacle means when the latch means is in a latching position to prevent movement of the movable frame portion; biasing means urging said latch means towards its latching position; said latch means being movable to an unlatched position wherein said portion thereof is free from said latch receptacle; and lever means pivotally mounted on said seat cushion and selectively swingable to engage and operate said latch means when said seat cushion is in said normal position.

3. A vehicle seat structure comprising: a support frame including an upwardly extending back portion joining a fore-and-aft extending bottom portion and cooperating therewith to form a generally L-shaped frame section as viewed from a side thereof and a backrest being connected to the back portion; said support frame including a depending leg structure fixed to and projecting downwardly from the forward end of said bottom portion; a seat cushion having an upper surface which is disposed generally horizontal for receiving an operator in a normal seated position when the seat cushion is in a normal position; said cushion having a rear surface making an angle of about 90° with the upper surface and, as viewed in its normal position, the fore-and-att dimension of the cushion being at least twice the thickness thereof; a first link structure having opposite ends respectively pivotally connected to the back portion of the support frame below the backrest and to the underside of the seat cushion by means defining respective first and second horizontal transverse pivot axes; a second link structure having opposite ends respectively pivotally connected to the lower end of said leg structure and to the underside of said seat cushion by means defining respective third and fourth horizontal transverse pivot axes; said first and second link structures being so positioned relative to each other that upon applying a lifting force to the rear portion of the seat cushion when the latter is in its normal position, the frist and second link structures act to guide to seat cushion to a folded position wherein the rear surface of the seat cushion faces upwardly and is at a level above the bottom of the backrest and wherein the upper surface of the seat cushion faces forwardly; said support frame including a movable portion and a fixed portion; the over-center link means being connected only to the movable frame portion; said fixed and movable frame portions having respective cooperating surface means for retaining and guiding said movable frame portion for fore-and-aft shifting movement; latch receptacle means formed in said cooperating surface means; a latch means movably mounted on said fixed frame portion and including a portion disposed for engagement with said latch receptacle means when the latch means is in a latching position to prevent movement of the movable frame portion; biasing means urging said latch means towards its latching position; said latch means being movable to an unlatched position wherein said portion thereof is free from said latch receptacle; and lever means pivotally mounted on said seat cushion and selectively swingable to engage and operate said latch means when seat cushion is in said normal position.

* * * * *

UNITED STATES PATENT OFFICE
CERTIFICATE OF CORRECTION

Patent No. 3,924,891　　　　　　　　Dated 9 December 1975

Inventor(s) Lary Lynn Williams

It is certified that error appears in the above-identified patent and that said Letters Patent are hereby corrected as shown below:

Column 7, line 8, delete "the" (second occurence) and insert --and--; line 11, before "rearwardly" insert --and faces--; line 13, before "cushion" insert --seat--.

Column 8, line 7, change "att" to --aft--.

Signed and Sealed this

Tenth Day of August 1976

[SEAL]

Attest:

RUTH C. MASON
*Attesting Officer*

C. MARSHALL DANN
*Commissioner of Patents and Trademarks*